Figure 1:
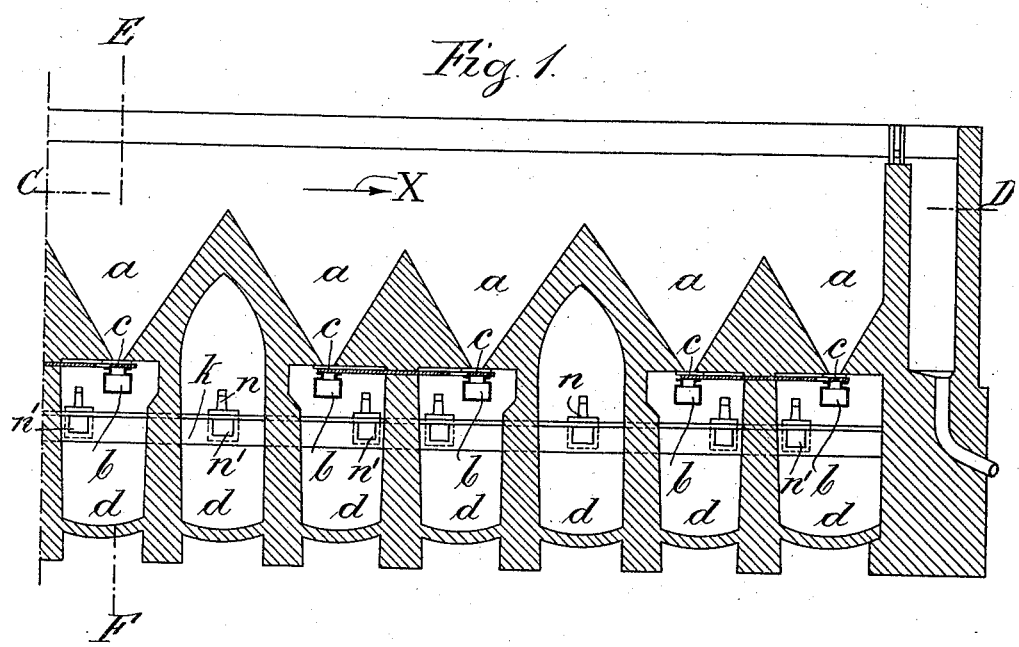

P. BUNZEL.
APPARATUS FOR PURIFYING SEWAGE AND THE LIKE.
APPLICATION FILED AUG. 5, 1913.

1,079,391.
Patented Nov. 25, 1913.
4 SHEETS—SHEET 1.

P. BUNZEL.
APPARATUS FOR PURIFYING SEWAGE AND THE LIKE.
APPLICATION FILED AUG. 5, 1913.

1,079,391.

Patented Nov. 25, 1913.

4 SHEETS—SHEET 4.

Witnesses:
Charles B. Crompton
John F. Heing

Inventor:
Paul Bunzel.
by Croydon Marks,
Attorney.

UNITED STATES PATENT OFFICE.

PAUL BUNZEL, OF CÖTHEN, GERMANY.

APPARATUS FOR PURIFYING SEWAGE AND THE LIKE.

1,079,391.    Specification of Letters Patent.    Patented Nov. 25, 1913.

Application filed August 5, 1913.   Serial No. 783,078.

*To all whom it may concern:*

Be it known that I, PAUL BUNZEL, a subject of the German Emperor, residing at 19ᵃ Antoinettenstrasse, Cöthen, Germany, have invented certain new and useful Improvements in Apparatus for Purifying Sewage and the like, of which the following is a specification.

This invention relates to apparatus for purifying or removing the sludge from sewage-water and the like of the type in which a plurality of settling troughs arranged one behind another transversely to the direction of the flow of the water are provided, these settling troughs being open below for the discharge of the sludge. The settling troughs are open below substantially over their whole length and open into sludge discharge conduits beneath the troughs and capable of being cut off therefrom.

The present invention has for its object to enable the sludge to be obtained as free from water as possible and for this purpose it is necessary to prevent any whirling of the water in the troughs in which the sludge has been in part deposited from the upper layers of the water.

According to the present invention valves or the like are interposed between the conduits and the troughs in such a manner that on opening or closing the valves the water in the troughs is not set in rotary motion and which, when closed, are adapted to entirely cut off the sludge conduits from the settling troughs so as to relieve the sludge conduits from the pressure of the water in the settling troughs and enable the sludge to be discharged and the sludge conduits cleaned without the aid of the water in the settling troughs. For this purpose the sludge conduits are supplied with water, after the sludge has been discharged, so as to fill the conduits before the valves are opened to reëstablish connection between the sludge conduits and the settling troughs. On thereupon opening the valves, a sudden rush of water from the settling troughs into the sludge conduits cannot take place for the reason that the sludge conduits are filled with water and the formation of whirlpools in the troughs is thus obviated.

The valves preferably comprise slidable or rotatable plates of unvariable height, that is, not moved vertically but preferably movable in a horizontal plane, that is to say, at right angles to the flow of the water from the settling troughs into the sludge conduits; this arrangement preventing the formation of whirlpools in the water when the valves are opened or closed.

In order to enable the sludge to be immediately separated from the water the sludge conduits are adapted to discharge into a common transverse collecting channel or the like which may be divided into suitable compartments and is provided with overflow devices for enabling the water above the sludge to be drawn off after the sludge has settled in the collecting channel. The overflow devices are preferably so constructed that the overflow opening can be gradually moved downwardly so that more and more water may be drawn off as the sludge settles. The overflow devices may comprise two concentric hollow wooden cylinders, one rotatable within the other, and provided with oppositely inclined slots adapted to register with each other at different heights according to the rotation of the inner cylinder and thus vary the position of the overflow opening.

In order to enable the separated sludge to be supplied in the usual manner to collecting chambers arranged beneath the settling troughs, the transverse collecting channel is provided with valved openings leading to the collecting chambers so that the sludge entering the collecting channel can be supplied from the same part of said channel to the corresponding collecting chamber. If desired, however, the sludge may be caused to traverse the collecting channel to be supplied to any other collecting chamber. The collecting channels are also provided with valved discharge conduits for distributing the sludge to the drying beds when required.

In order that the invention may be more clearly understood reference is made to the accompanying drawings whereon the preferred form of my improved apparatus is illustrated by way of example.

Figure 2:
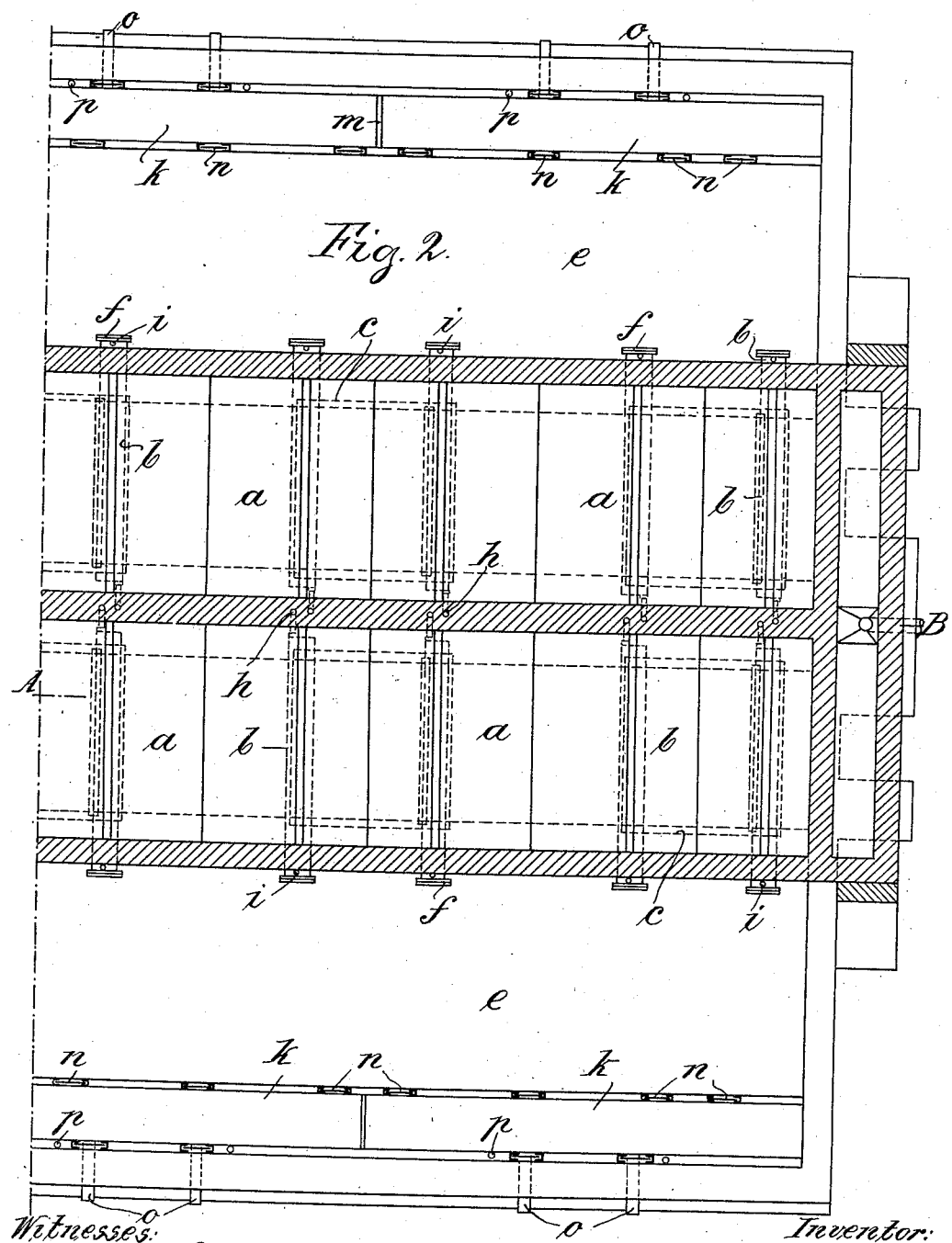
Figure 3:
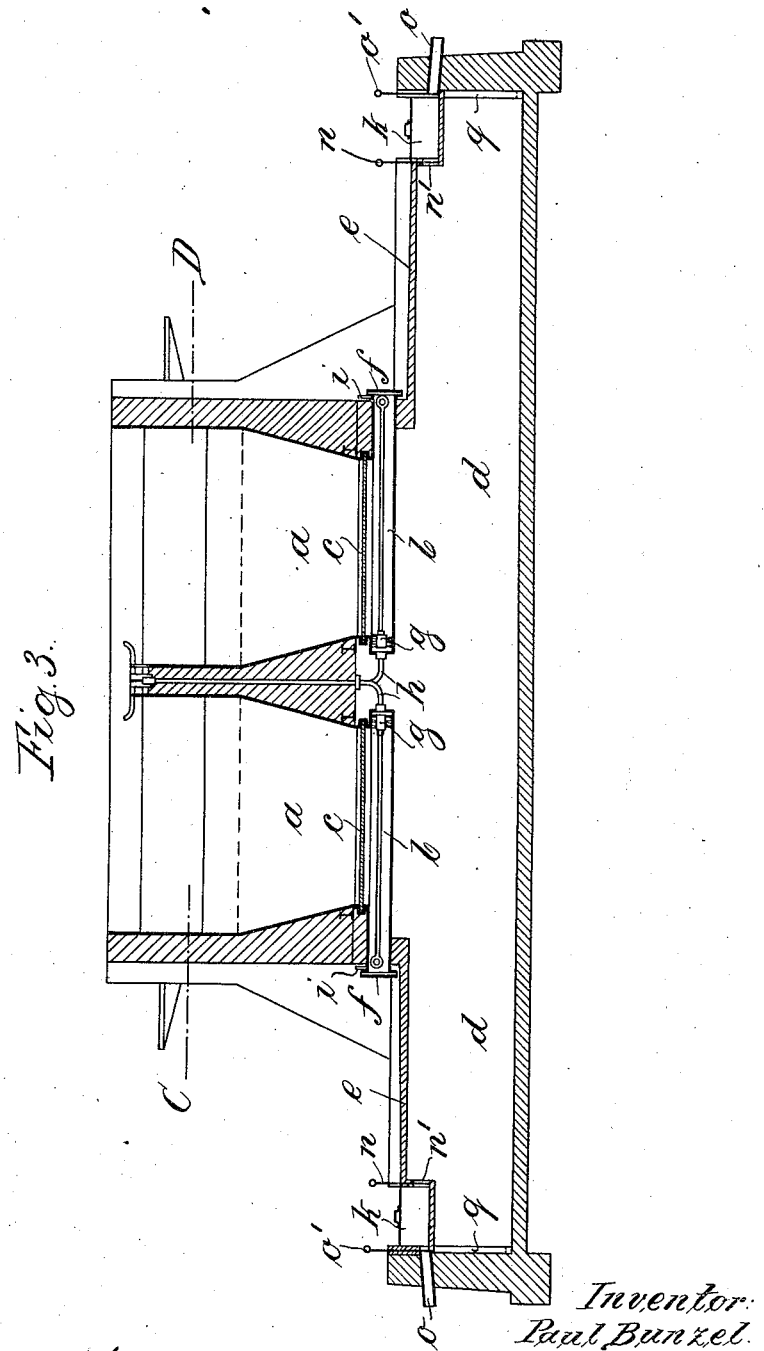
Figure 4:
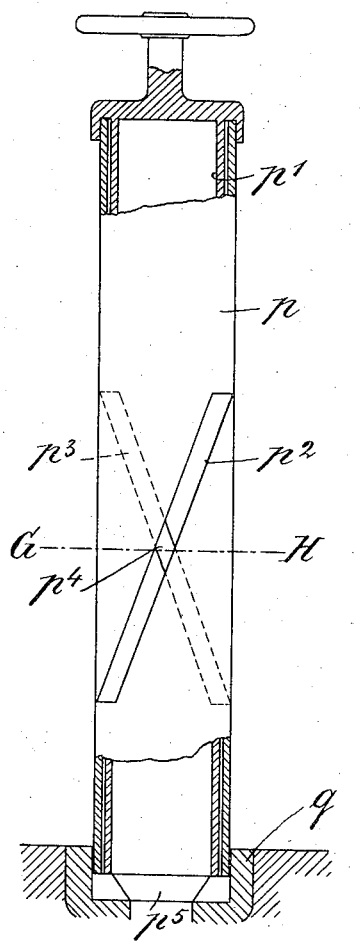
Figure 5:
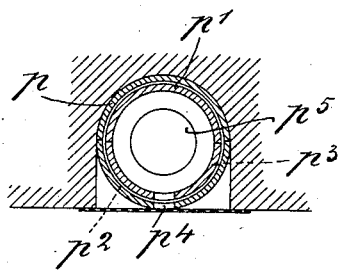

Figure 1 is a fragmentary vertical section of the purifying apparatus on the line A—B of Fig. 2. Fig. 2 is a horizontal section on the line C—D of Fig. 1 and Fig. 3. Fig. 3 is a transverse section on the line E—F of Fig. 1 showing the complete apparatus. Fig. 4 is a detail view partly in section of the overflow regulating device, and Fig. 5 is a detail view in section on the line G—H of Fig. 4.

The purifying apparatus comprises a plurality of settling troughs $a$ arranged one behind another transversely to the direction of the flow of the water to be purified, indicated by the arrow X in Fig. 1. The troughs $a$ are open below over their whole length and adapted to discharge into sludge conduits $b$ which may be cut off from the troughs by means of sliding plate valves $c$ or the like. Beneath the settling troughs $a$ are arranged sludge collecting chambers $d$.

The sludge conduits $b$ are provided at their outer ends (see Fig. 3) with removable end covers $f$ or the like and arranged within each conduit $b$ is a cleaning brush $g$. The inner ends of the conduits $b$ are connected to water supply pipes $h$ and in order to permit of the escape of the air in the conduits $b$, when the latter are being filled with water, the discharge end of each conduit $b$ is provided with a valve $i$ or the like.

The conduits $b$ discharge the sludge onto an incline $e$ terminating in a transverse collecting channel $k$ or the like which may be divided into compartments by means of divisions $m$ and provided with valves $n$ controlling valve openings $n'$ leading to the collecting chambers $d$. The collecting channel $k$ is also provided with discharge conduits $o$ controlled by valves $o'$ for discharging the sludge onto drying beds or the like. The collecting channels $k$ are also provided with overflow regulating devices $p$ by means of which the water above the sludge may be drawn off, the overflow devices $p$ being connected to fall pipes $q$ through which the water is discharged. The overflow device preferably comprises two hollow cylinders $p$ and $p'$, the cylinder $p'$ being rotatable within the outer cylinder. Each cylinder is provided with an inclined slot $p^2$ and $p^3$ respectively, provided at the same height in the cylinders so that an opening $p^4$ is formed where the two slots intersect, the opening $p^4$ constituting the overflow opening so that the water in the channel $k$ passes therethrough into the inner cylinder and through the opening $p^5$ in the bottom thereof into the fall pipe $q$. The position of the opening $p^4$ may be varied by adjusting the cylinder $p'$ within the cylinder $p$. If desired the slots $p^2$ and $p^3$ may be otherwise suitably arranged. Thus, for example, one of the slots may be vertical and the other slot inclined thereto.

The operation of the apparatus is as follows: The end covers $f$ of the sludge conduits $b$ are first closed and the sliding plate valves $c$ opened. The sludge which settles in the settling troughs $a$ then falls into the sludge conduits $b$. When the sludge conduits are full, the valves $c$ are closed so that the sludge is cut off from the water in the troughs. Thereupon the end covers $f$ of the sludge conduits are opened and the sludge discharged into the channels $k$. The sludge conduits $b$ may thereupon be cleaned, by drawing out the brushes $g$ and the end covers $f$ thereupon replaced. The valves $i$ at the discharge ends of the sludge conduits are then opened and water supplied to the conduits from the water pipes $h$ until the conduits are filled with water. The valves $c$ are thereupon opened and the sludge conduits thus connected with the settling troughs without disturbing the water therein. The sludge in the channels $k$ is separated from the water by means of the water overflow devices $p$ and then either distributed by way of the discharge outlets $o$ to the drying beds or supplied to the collecting chambers $d$ through the valves $n$ according to the season of the year, weather conditions or the like. The sludge supplied to the channel $k$ from any one of the sludge conduits $b$ can be left either in the same part of the channel $c$ and thereupon supplied to the adjacent collecting chamber $d$ or the sludge may be caused to traverse the channel $k$ and supplied to any other collecting chamber $d$ to be mixed with the sludge from the other sludge conduits $b$.

I claim:—

1. The combination with apparatus for purifying sewage and the like having a plurality of settling troughs open below and sludge discharge conduits beneath said troughs; of valves intermediate the conduits and troughs for cutting off said conduits from said troughs, a removable end cover for the discharge end of said conduits and means for supplying water to said conduits after the sludge has been discharged and the end covers replaced and before said valves are re-opened.

2. The combination with apparatus for purifying sewage and the like having a plurality of settling troughs open below and sludge discharge conduits beneath said troughs; of valves of unvariable height intermediate the conduits and troughs for cutting off said conduits from said troughs, a removable end cover for the discharge end of said conduits and means for supplying water to said conduits after the sludge has been discharged and the end covers replaced and before said valves are re-opened.

3. The combination with apparatus for purifying sewage and the like having a plurality of settling troughs open below and sludge discharge conduits beneath said troughs; of sliding plate valves intermediate the conduits and troughs for cutting off said conduits from said troughs, a removable end cover for the discharge end of said conduits and means for supplying water to said conduits after the sludge has been discharged and the end covers replaced and before said valves are re-opened.

4. The combination with apparatus for purifying sewage and the like having a plurality of settling troughs open below and sludge discharge conduits beneath said troughs; of valves intermediate the conduits and troughs and movable in horizontal plane for cutting off said conduits from said troughs, a removable end cover for the discharge end of said conduits and means for supplying water to said conduits after the sludge has been discharged and the end covers replaced and before said valves are re-opened.

5. The combination with apparatus for purifying sewage and the like having a plurality of settling troughs open below and sludge discharge conduits beneath said troughs; of valves intermediate the conduits and troughs for cutting off said conduits from said troughs, a removable end cover for the discharge end of said conduits, a transverse collecting channel in which the water is separated from the sludge and means for supplying water to said conduits after the sludge has been discharged and the end covers replaced before said valves are re-opened.

6. The combination with apparatus for purifying sewage and the like having a plurality of settling troughs open below and sludge discharge conduits beneath said troughs; of valves intermediate the conduits and troughs for cutting off said conduits from said troughs, a removable end cover for the discharge end of said conduits, a transverse collecting channel in which the water is separated from the sludge, variable overflow regulating devices in said channel for drawing off the water and means for supplying water to said conduits after the sludge has been discharged and the end covers replaced and before said valves are re-opened.

7. The combination with apparatus for purifying sewage and the like having a plurality of settling troughs open below and sludge discharge conduits beneath said troughs; of valves intermediate the conduits and troughs for cutting off said conduits from said troughs, a removable end cover for the discharge end of said conduits, a transverse collecting channel in which the water is separated from the sludge, a variable overflow regulating device comprising hollow cylinders rotatable one within another and having registering slots therein and means for supplying water to said conduits after the sludge has been discharged and the end covers replaced and before said valves are re-opened.

8. The combination with apparatus for purifying sewage and the like having a plurality of settling troughs open below and sludge discharge conduits beneath said troughs; of valves intermediate the conduits and troughs for cutting off said conduits from said troughs, a removable end cover for the discharge end of said conduits, a transverse collecting channel in which the water is separated from the sludge, a variable overflow regulating device comprising hollow cylinders rotatable one within another and having inclined slots at the same height forming an overflow opening at their intersection, and means for supplying water to said conduits after the sludge has been discharged and the end covers replaced and before said valves are re-opened.

9. The combination with apparatus for purifying sewage and the like having a plurality of settling troughs open below, sludge discharge conduits beneath said troughs and sludge collecting chambers beneath said settling troughs and conduits, of transverse collecting channels to which the sludge is supplied from said conduits having valved openings opening into said collecting chambers.

10. The combination with apparatus for purifying sewage and the like having a plurality of settling troughs open below, sludge discharge conduits beneath said troughs and sludge collecting chambers beneath said settling troughs and conduits, of transverse collecting channels to which the sludge is supplied from said conduits having valved openings opening into said collecting chambers, and discharge outlets for discharging the sludge onto drying beds or the like.

11. The combination with apparatus for purifying sewage and the like having a plurality of settling troughs open below and sludge discharge conduits beneath said troughs, of a transverse collecting channel to which the sludge is supplied from said conduits and a variable overflow regulating device in said channel for drawing off the water therein.

12. The combination with apparatus for purifying sewage and the like having a plurality of settling troughs open below and sludge discharge conduits beneath said troughs, of a transverse collecting channel to which the sludge is supplied from said conduits and a variable overflow regulating device comprising hollow cylinders rotatable one within another and having registering slots therein.

13. The combination with apparatus for purifying sewage and the like having a plurality of settling troughs open below and sludge discharge conduits beneath said troughs, of a transverse collecting channel to which the sludge is supplied from said conduits and a variable overflow regulating device comprising hollow cylinders rotatable one within another and having inclined slots at the same height forming an overflow opening at their intersection.

In testimony whereof I have affixed my signature in presence of two witnesses.

PAUL BUNZEL.

Witnesses:
ERICH KING,
CARL REHLANNY.

Copies of this patent may be obtained for five cents each, by addressing the "Commissioner of Patents, Washington, D. C."